United States Patent
Wang et al.

(10) Patent No.: US 12,408,077 B2
(45) Date of Patent: Sep. 2, 2025

(54) LOAD BALANCING METHOD AND WIRELESS COMMUNICATION SYSTEM

(71) Applicant: Rohde & Schwarz GmbH & Co. KG, Munich (DE)

(72) Inventors: Lilei Wang, Munich (DE); Juergen Schlienz, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 440 days.

(21) Appl. No.: 18/157,661

(22) Filed: Jan. 20, 2023

(65) Prior Publication Data

US 2024/0251291 A1 Jul. 25, 2024

(51) Int. Cl.
*H04W 28/086* (2023.01)
*H04W 72/044* (2023.01)

(52) U.S. Cl.
CPC ..... *H04W 28/0861* (2023.05); *H04W 72/044* (2013.01)

(58) Field of Classification Search
CPC .................. H04W 28/0861; H04W 72/044
See application file for complete search history.

(56) References Cited

U.S. PATENT DOCUMENTS

| | | | |
|---|---|---|---|
| 2017/0272219 A1* | 9/2017 | Park | H04B 7/024 |
| 2019/0104480 A1* | 4/2019 | Hasholzner | G06F 1/324 |
| 2019/0138934 A1* | 5/2019 | Prakash | G06V 10/7747 |
| 2020/0146048 A1 | 5/2020 | Lee et al. | |
| 2020/0413323 A1* | 12/2020 | Neeli | H04B 17/327 |
| 2021/0144202 A1* | 5/2021 | Maciocco | H04L 67/1051 |
| 2021/0144517 A1* | 5/2021 | Guim Bernat | G06F 9/5072 |
| 2021/0168653 A1* | 6/2021 | Arnold | H04W 28/0933 |
| 2021/0176174 A1* | 6/2021 | Chou | H04L 67/1008 |
| 2022/0124678 A1 | 4/2022 | Lee et al. | |

* cited by examiner

*Primary Examiner* — Kashif Siddiqui
(74) *Attorney, Agent, or Firm* — CHRISTENSEN O'CONNOR JOHNSON KINDNESS PLLC

(57) ABSTRACT

A load balancing method of balancing computational workload in a wireless communication network is described. The wireless communication network includes at least two nodes being configured to communicate with each other. The at least two nodes include a first node and a second node. Further, a wireless communication network is described.

20 Claims, 3 Drawing Sheets

LOAD BALANCING METHOD AND WIRELESS COMMUNICATION SYSTEM

FIELD OF THE DISCLOSURE

Embodiments of the present disclosure generally relate to a load balancing method of balancing computational workload in a wireless communication network. Embodiments of the present disclosure further relate to a wireless communication system.

BACKGROUND

In modern wireless communication networks, an increasing number of computational artificial intelligence (AI) tasks emerge that have to be performed by the individual nodes of the communication network in order to ensure high data rate communication between the nodes.

In some wireless communication networks, these AI tasks have to be processed as quickly as possible in order to guarantee a smooth operation of the communication network. For example, several autonomous vehicles may communicate with each other regarding planned trajectories of each vehicle, and may have to agree on the planned trajectories in real time.

Usually, not all nodes of the wireless communication network have the same computational capacities, which may lead to bottlenecks in the processing of certain computational AI tasks.

Thus, there is a need for a load balancing method and for a wireless communication system that allow for avoiding bottlenecks in the processing of computational AI tasks.

SUMMARY

Embodiments of the present disclosure provide a load balancing method of balancing computational workload in a wireless communication network. The wireless communication network may comprise at least two nodes configured to communicate with each other. The at least two nodes comprise a first node and a second node. In an embodiment, the load balancing method comprises the steps of determining, by the first node, at least one first load parameter, wherein the at least one first load parameter is indicative of a computational workload of the first node, determining, by the second node, at least one second load parameter, wherein the at least one second load parameter is indicative of a computational workload of the second node; transmitting, by the first node, the at least one first load parameter to the second node, and allocating, by at least the second node, a computational artificial intelligence (AI) task to at least one of the first node and the second node based on the at least one first load parameter and based on the at least one second load parameter.

Therein and in the following, the term "computational workload" is understood to denote the currently used computational resources of the respective node compared to or rather divided by the total available computational resources of the respective node.

Accordingly, the load parameters may comprise information on the currently used computational resources of the respective node, the total available computational resources of the respective node, the ratio of the currently used and total available computational resources of the respective node, and/or currently free computational resources of the respective node.

Further, the term "computational resources" relates to a metric for the computational capacities of the respective node. For example, the computational resources relate to floating operations per second (FLOPS) and/or memory.

Thus, the load parameters may comprise current FLOPS of the respective node, maximum possible FLOPS of the respective node, a ratio of the current FLOPS and the maximum possible FLOPS of the respective node, a current headroom of FLOPS of the respective node, a current memory usage of the respective node, a maximum memory usage of the respective node, a ratio of the current memory usage and the maximum memory usage of the respective node, and/or a current headroom of memory of the respective node.

The load balancing methods according the present disclosure are based on the idea to determine a metric for the current workload of the respective nodes, namely the load parameters, and to redistribute computational AI tasks to the different nodes of the wireless communication network based on the load parameters.

For example, if the at least one first load parameter indicates that the first node has significant headroom of computational resources, while the at least one second load parameter indicates that the second node has significant workload, one or several computational AI tasks previously performed by the second node may be allocated to the first node, such that the workload of the second node is reduced. Thus, the computational AI tasks are distributed over the available nodes of the wireless communication network, such that bottlenecks in processing the AI tasks are efficiently avoided.

According to an aspect of the present disclosure, the second load parameter is, for example, transmitted to the first node, wherein the computational AI task is mutually allocated by the first node and the second node. In other words, the first node and the second node agree on which one of the nodes takes over the computational AI task, e.g. by exchanging corresponding messages.

In an embodiment of the present disclosure, at least one of the first node and the second node is established as a base station. For example, at least one of the first node and the second node may be a 4G base station and/or a 5G base station that is configured to communicate via 4G and/or 5G New Radio protocols. In some embodiments, both the first node and the second node may be established as a base station, respectively.

According to another aspect of the present disclosure, at least one of the first node and the second node is established, for example, as user equipment (UE). Therein and in the following, the term "user equipment" denotes any type of user-side electronic device being configured to communicate wirelessly with other electronic devices. For example, the UE may be established as a mobile phone, as a tablet, as a wireless router, as a handheld radio, as a stationary radio, as a vehicle with built-in wireless communication devices, etc. In some embodiments, both the first node and the second node may be established as UE, respectively.

In a further embodiment of the present disclosure, the computational AI task is a machine-learning inference task. In other words, the computational AI task may relate to processing of data by a pre-trained machine-learning model. In some embodiments, the computational AI task may be any type of machine-learning inference task, depending on the application of the wireless communication network. For example, the machine-learning inference task may relate to channel state information compression, beam management, or determination of a position, e.g. determination of a position of the first node and/or of the second node.

In some embodiments, the at least one first load parameter and the at least one second load parameter respectively comprise a computing headroom report, a power consumption report, a state of charge report, and/or a type of power supply.

In some embodiments, the computing headroom report may comprise information on a current headroom of FLOPS and/or on a current headroom of memory, as described above.

In some embodiments, the power consumption report may comprise information on a current power consumption of the respective node, a maximum power consumption of the respective node, a headroom of power consumption of the respective node, and/or a ratio of the current power consumption and the maximum power consumption of the respective node.

The type of power supply relates to whether the respective node is battery-powered or grid-powered.

In some embodiments, the load parameters may comprise the state of charge report if the respective node is powered by a battery. Grid-powered nodes may be preferred for allocating the computational AI task over battery-powered nodes in order to avoid unnecessary strain on the remaining state of charge of battery-powered nodes.

The state of charge report may comprise information on a current state of charge of the respective node, a maximum state of charge of the respective node and/or a ratio of the current state of charge and the maximum state of charge of the respective node. For example, nodes with higher remaining state of charge may be preferred for allocating the computational AI task over nodes with lower remaining state of charge.

According to an aspect of the present disclosure, the at least one first load parameter is, for example, determined and transmitted to the second node according to a predefined schedule. In some embodiments, the at least one first load parameter may be determined and transmitted periodically, for example every 100 ms, every 1s or in any other suitable time interval. However, it is to be understood that the schedule may also be aperiodic. For example, the schedule may be random or pseudo-random.

Transmission of the at least one first load parameter may be initiated by the first node or by the second node. In other words, the first node may determine and transmit the at least one first load parameter of its own volition. Alternatively or additionally, the second node may request the first node to determine and transmit the at least one first load parameter.

According to an aspect of the present disclosure, transmission of the at least one first load parameter is initiated, for example, by the first node based on the at least one first load parameter, or by the second node based on the at least one second load parameter. In other words, if the first node detects a high workload (i.e. if the first load parameter indicates a high workload), the first node may initiate a redistribution of computational AI tasks by transmitting the at least one first load parameter to the second node. Alternatively or additionally, if the second node detects a high workload (i.e. if the second load parameter indicates a high workload), the second node may initiate a redistribution of computational AI tasks by requesting the first node to determine and transmit the at least one first load parameter.

In some embodiments, the at least one first load parameter is compared with at least one corresponding first threshold. Alternatively or additionally, the at least one second load parameter is compared with at least one corresponding second threshold. Accordingly, the first node may initiate the redistribution of computational AI tasks as described above if the at least one first load parameter is larger than the corresponding first threshold. Alternatively or additionally, the second node may initiate the redistribution of computational AI tasks as described above if the at least one second load parameter is larger than the corresponding second threshold.

In an embodiment of the present disclosure, the at least two nodes are configured to communicate at least one computation parameter to the communication network, respectively, wherein the at least one computation parameter is indicative of computational resources of the respective node, and wherein a coordinating node is selected from the at least two nodes based on the computation parameters of the at least two nodes. In other words, the at least two nodes mutually agree on one of the at least two nodes becoming the coordinating node.

For example, the node having the largest computational resources, i.e. the largest maximum FLOPS and/or the largest maximum memory, may be selected to be the coordinating node. Further, grid-powered nodes may be preferred over battery-powered nodes for selecting the coordinating node.

In general, the coordinating node then corresponds to the node receiving the respective at least one load parameter from the other nodes of the communication network, i.e. the coordinating node corresponds to the "second node" described above.

It is noted that in mobile communication networks such as 4G or 5G New Radio networks, the coordinating node may be a base station by default, as base stations typically have vastly superior computational resources compared to user-side devices. If several base stations are present in the wireless communication network, the coordinating node may be selected from the several base stations.

A plurality of computational AI tasks may be allocated to the at least two nodes by the coordinating node. In other words, the coordinating node distributes the computational AI tasks among the plurality of nodes of the wireless communication network based on the load parameters received from the other nodes and based on its own at least one load parameter, such that an optimal load balance is obtained between the nodes.

Another aspect of the present disclosure provides, for example, that a new coordinating node is selected if the previous coordinating node disconnects from the wireless communication network. For example, the previous coordinating node may leave the coverage area of the other nodes, or the received signal quality from the previous coordinating node may drop below a critical threshold.

In an embodiment of the present disclosure, a new coordinating node is selected if a new node connects to the wireless communication network, wherein the new node has more computational resources than the previous coordinating node. Thus, it is ensured that the node having the largest computational resources takes over the task of allocating the computational AI tasks to the plurality of nodes, thereby saving computational resources on the nodes with less computational resources.

In a further embodiment of the present disclosure, the computation parameters are transmitted by a sidelink. In some embodiments, the computation parameters may be transmitted by a 4G sidelink, e.g. by an LTE sidelink, and/or by a 5G sidelink. Thus, no intermediary base station is necessary for transmitting the computation parameters.

It is also conceivable that the load parameters are transmitted between the nodes by a sidelink. Accordingly, the load parameters may be transmitted by a 4G sidelink, e.g. by an LTE sidelink, and/or by a 5G sidelink. Thus, no intermediary base station is necessary for transmitting the load parameters.

According to another aspect of the present disclosure, the first node and the second node are configured, for example, to communicate with each other via 4G and/or 5G New Radio. However, it is to be understood that any other suitable wireless communication technique may be used.

Embodiments of the present disclosure further provide a wireless communication system. In an embodiment, the wireless communication network comprises at least two nodes being configured to communicate with each other, wherein the at least two nodes comprise a first node and a second node. The first node is configured to determine at least one first load parameter, wherein the at least one first load parameter is indicative of a computational workload of the first node. The second node is configured to determine at least one second load parameter, wherein the at least one second load parameter is indicative of a computational workload of the second node. The first node is configured to transmit the at least one first load parameter to the second node. The second node is configured to allocate a computational artificial intelligence (AI) task to at least one of the first node and the second node based on the at least one first load parameter and based on the at least one second load parameter.

In some embodiments, the wireless communication system is configured to perform one or more of, or all of, the load balancing methods described above.

Regarding the further advantages and properties of the wireless communication system, reference is made to the explanations given above with respect to the load balancing method, which also hold for the wireless communication system and vice versa.

In an embodiment of the present disclosure, the second node is configured to transmit the at least one second load parameter to the first node, wherein the first node and the second node are configured to mutually allocate the computational AI task. In other words, the first node and the second node agree on which one of the nodes takes over the computational AI task, e.g. by exchanging corresponding messages.

In some embodiments, the wireless communication system is a 4G communication system or a 5G New Radio communication system. However, it is to be understood that any other suitable wireless communication technique may be used.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
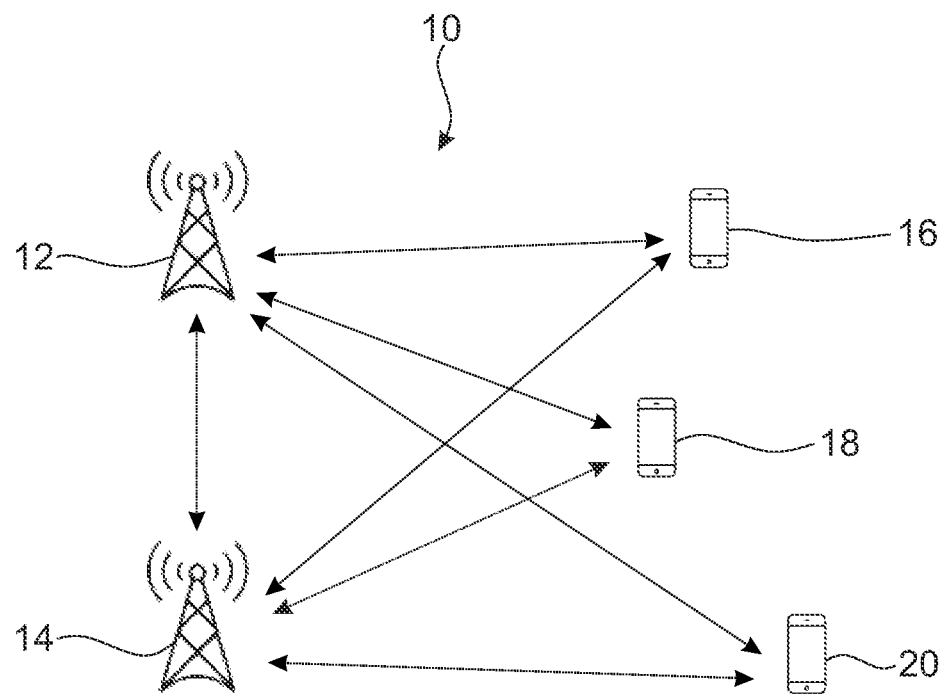
FIG. 1 schematically shows a wireless communication system according to a first embodiment of the present disclosure.

FIG. 1 schematically shows an example of a wireless communication system comprising a plurality of nodes. In the embodiment shown in FIG. 1, the wireless communication network 10 is established as a mobile communication network according to the 4G and/or 5G standard. The plurality of nodes comprises a first base station 12 and a second base station 14. The plurality of nodes further comprise a first user equipment (UE) 16, a second UE 18, and a third UE 20. Of course, the wireless communication network 10 may comprise any other number of base stations and UEs.

The UEs 16, 18, 20 may be established as a mobile phone, as a tablet, or as any other type of smart device being configured to communicate via 4G and/or 5G New Radio, respectively. The UEs 16, 18, 20 may communicate with each other via at least one of the base stations 12, 14, via any communications protocol known in the art or developed in the future. It is also conceivable that the UEs 16, 18, 20 may communicate with each other directly by a sidelink, such as a 4G sidelink, an LTE sidelink, or a 5G sidelink.

Further, the base stations 12, 14 may communicate with each other via 4G or 5G New Radio protocol. Alternatively or additionally, the base stations 12, 14 may be connected to each other via a wide area network (WAN), a local area network (LAN), and/or via the internet.

Figure 2:
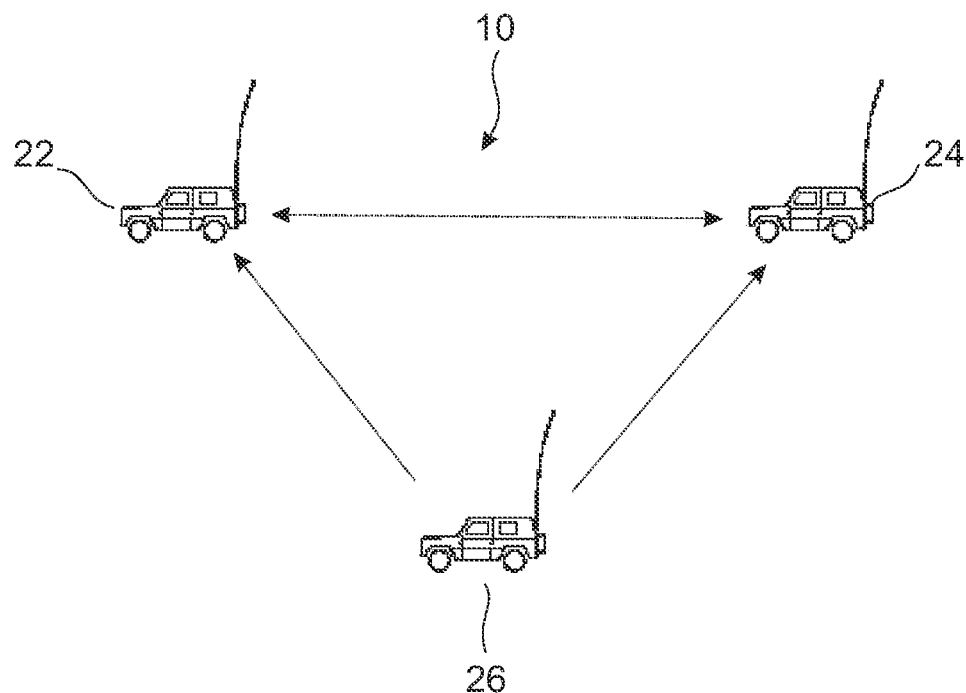
FIG. 2 schematically shows a wireless communication system according to a second embodiment of the present disclosure.

FIG. 2 schematically shows another embodiment of a wireless communication network 10 comprising a plurality of nodes. In the embodiment shown in FIG. 2, the nodes comprise a first vehicle 22, a second vehicle 24, and a third vehicle 26. The vehicles 22, 24, 26 are configured to communicate with each other over a wireless channel. For example, the wireless channel may correspond to a sidelink, such as a 4G sidelink, an LTE sidelink, or a 5G sidelink.

In wireless communication networks as depicted in FIGS. 1 and 2, a plurality of different computational artificial intelligence (AI) tasks have to be performed in order to guarantee a smooth operation of the wireless communication network 10. For example, these computational AI tasks may relate to machine-learning inference tasks.

For the wireless communication network 10 of FIG. 1, these machine-learning inference tasks may for example relate to channel state information compression, beam management, and/or a determination of positions of the UEs 16, 18, 20. For the wireless communication network 10 of FIG. 2, these machine-learning inference tasks may for example relate to trajectory-planning and/or a determination of positions of the vehicles 22, 24, 26.

In general, the wireless communication network 10 is configured to perform a load balancing method in order to balance computational workload associated with the computational AI tasks between the nodes of the wireless communication network 10.

Figure 3:
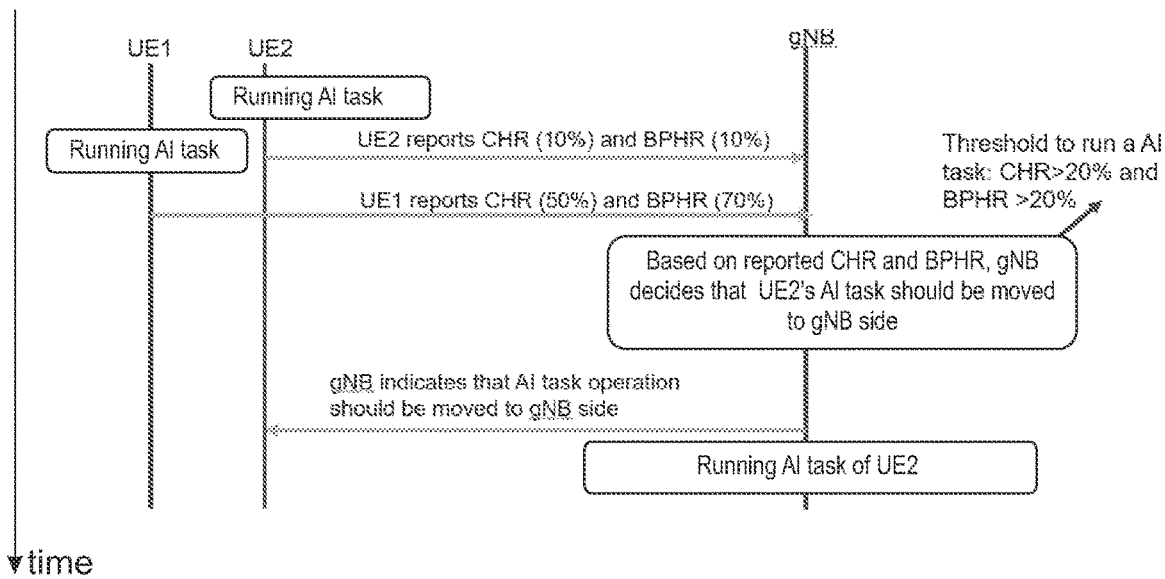
FIG. 3 shows a flow chart of a load balancing method according to an embodiment of the present disclosure.

FIG. 3 shows a representative flow chart of an embodiment of such a load balancing method. In the shown case, the first UE 16 ("UE1" in FIG. 3) and the second UE 18 ("UE2" in FIG. 3) each perform a computational AI task. The UEs 16, 18 each determine at least one load parameter that is indicative of a computational workload of the respective UE 16, 18.

In the particular example shown in FIG. 3, the at least one load parameter comprises a computing headroom report (CHR) and a battery power headroom report (BPHR), indicating how much percent of the computational resources (FLOPS and memory) are free to use and how much state of charge the batteries powering the UEs 16, 18 have left, respectively. However, it is to be understood that the at least one load parameter may comprise other suitable parameters, such as a current temperature of the respective UE 16, 18 (indicating a risk of overheating), a current power consumption of the respective UE 16, 18, or any of the other possibilities described above.

The UEs 16, 18 transmit the determined load parameters to a base station ("gNB" in FIG. 3), which may be any one of the base stations 12, 14 shown in FIG. 1. For example, the UEs 16, 18 may transmit the determined load parameters via an appropriately configured physical uplink shared channel (PUSCH) or via an appropriately configured physical uplink control channel (PUCCH).

The base station 12 or 14 receives the load parameters from the UEs 16, 18, and compares the load parameters with corresponding thresholds. In the particular example shown in FIG. 3, the thresholds for running the computational AI task are a CHR of at least 20% and a BPRH of at least 20%. As the first UE 16 fulfills these requirements with a CHR of 50% and a BPHR of 70%, the base station 12 or 14 decides that the first UE 16 can keep performing the computational AI task. However, the second UE 18 does not fulfill these requirements with a CHR of 10% and a BPHR of 10%. Accordingly, the base station 12 or 14 decides to take over the computational AI task from the second UE 18.

Accordingly, the base station 12 or 14 sends a message to the second UE 18 indicating that the computational AI task is moved to the base station 12 or 14. Further, the base station 12 or 14 starts performing the computational AI task previously performed by the second UE 18.

Figure 4:
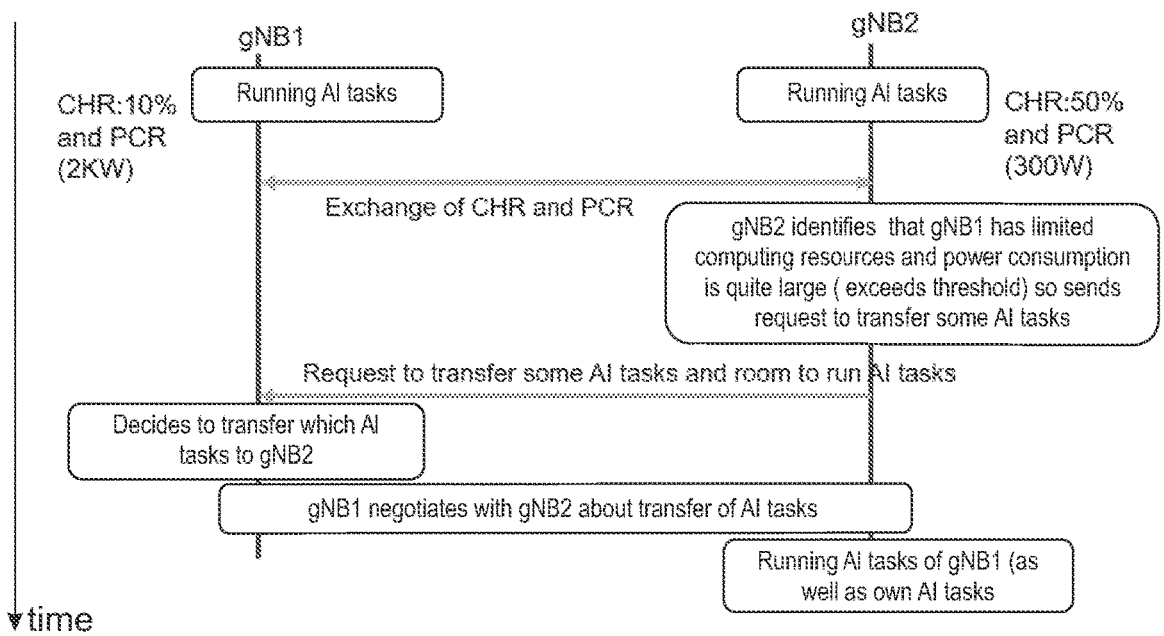
FIG. 4 shows a flow chart of a load balancing method according to another embodiment of the present disclosure.

FIG. 4 shows a representative flow chart of another embodiment of the load balancing method. In this embodiment, the first base station 12 ("gNB1") and the second base station ("gNB1") each perform a computational AI task. The base stations 12, 14 each determine at least one load parameter that is indicative of a computational workload of the respective base station 12 or 14.

In the particular example shown in FIG. 4, the at least one load parameter comprises a computing headroom report (CHR) and a power consumption report (PCR). The power consumption report may comprise information on a current power consumption of the respective grid-powered base station 12 or 14. However, it is to be understood that any other types of suitable load parameters may be determined.

The base stations exchange the determined load parameters, i.e. the first base station 12 transmits the determined load parameters to the second base station 14 and vice versa. The second base station 14 recognizes that the power consumption of the first base station (2 kW) is above a corresponding threshold (e.g. 1 kW) and that the CHR of the first base station 12 (10%) is significantly smaller than its own CHR (50%). Accordingly, the second base station 14 transmits a request to the first base station, namely a request to transfer computational AI tasks from the first base station 12 to the second base station 14. Optionally, the second base station may transmit information on available computational resources for processing computation AI tasks ("room to run AI tasks" in FIG. 4). Based on the request received from the second base station 18, the first base station determines which computational AI tasks are to be allocated to the second base station 14.

The bases stations 12, 14 exchange further messages in order to agree on the computational AI task(s) that are to be allocated to the second base station 14. After an agreement is reached, the second base station 14 starts performing the computational AI task(s) previously performed by the first base station 12 that are now allocated to the second base station 14.

Figure 5:
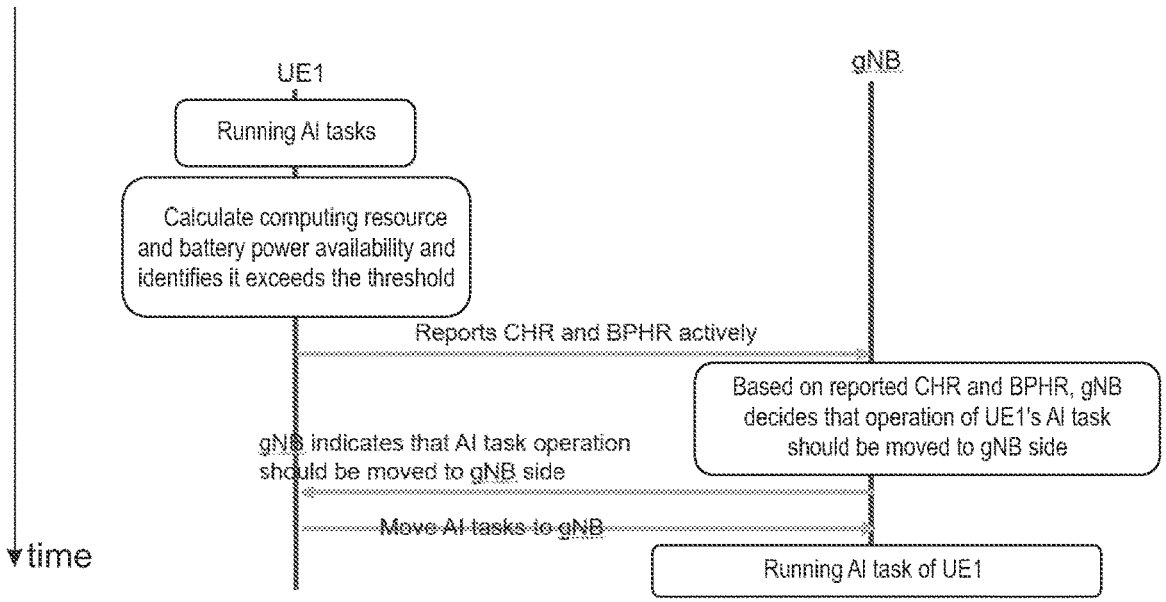
FIG. 5 shows a flow chart of a load balancing method according to yet another embodiment of the present disclosure.

FIG. 5 shows a representative flow chart of another embodiment of the load balancing method. In the shown embodiment, the first UE 16 performs a computational AI task. The first UE 16 determines at least one load parameter that is indicative of a computational workload of first UE 16. In the particular example shown in FIG. 5, the at least one load parameter comprises a computing headroom report (CHR) and a battery power headroom report (BPHR).

The first UE 16 determines that the used computational resources of the first UE 16 and/or the power usage of the first UE 16 exceeds a threshold, which means that the CHR and/or the BPHR are below a corresponding threshold. Thus, the first UE 16 actively reports the at least one load parameter to a base station 12 or 14.

However, it is also conceivable that the first UE 16 may report the at least one load parameter according to a predefined schedule, which may be periodic or aperiodic. Further, it is also conceivable that the base station 12 or 14 requests the first UE 16 to determine and transmit the at least one load parameter.

Based on the at least one load parameter received from the first UE 16, the base station 12 or 14 decides to take over the computational AI task from the first UE 16. Accordingly, the base station 12 or 14 sends a message to the first UE 16 indicating that the computational AI task is to be moved to the base station 12 or 14, such that the first UE 16 stops performing the computational AI task. Further, the base station 12 or 14 starts performing the computational AI task previously performed by the first UE 16.

Figure 6:
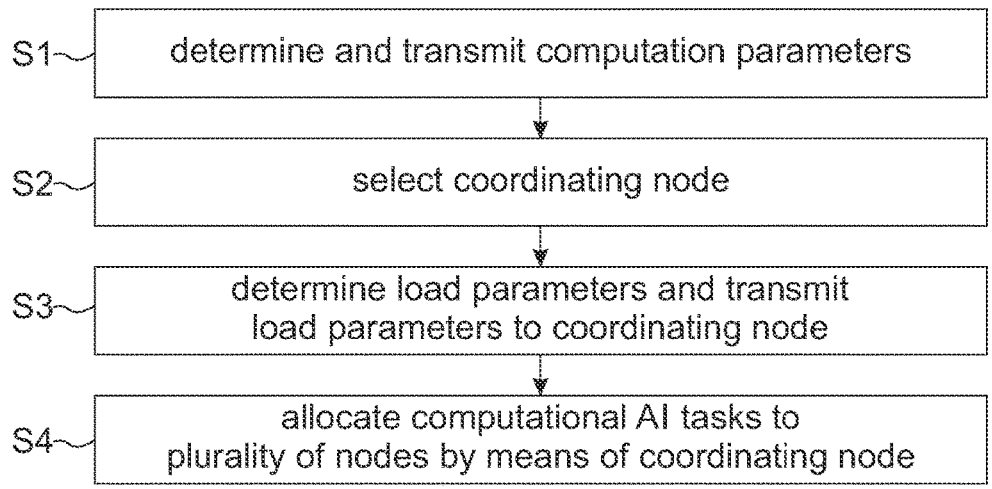
FIG. 6 shows a flow chart of a load balancing method according to still another embodiment of the present disclosure.

FIG. 6 shows a representative flow chart of another embodiment of the load balancing method, which is associated with the wireless communication system 10 of FIG. 2. However, it is to be understood that the load balancing method depicted in FIG. 6 is not restricted to vehicles, but may in principle be used for any other wireless communication network.

Without restriction of generality, this example of the method is described with reference to FIG. 2 in the following. The vehicles 22, 24, 26, determine at least one computation parameter, respectively, and transmit the at least one determined computation parameter to the remaining wireless communication network 10, i.e. to the other vehicles 22, 24, 26 (step S1).

The computation parameters are indicative of computational resources of the respective vehicle 22, 24, 26. For example, the computation parameters may comprise a CHR, a BPHR, a PCR, or any other type of suitable information regarding the computational resources of the respective vehicle 22, 24, 26.

The computation parameters may be transmitted by a sidelink. For example, the computation parameters are transmitted by a 4G sidelink, an LTE sidelink, and/or by a 5G sidelink.

A coordinating node is selected from the vehicles 22, 24, 26 based on the computation parameters of the vehicles 22, 24, 26 (step S2). In other words, the vehicles 22, 24, 26 mutually agree on one of vehicles 22, 24, 26 becoming the coordinating node. For example, the vehicle 22, 24, 26 having the largest computational resources, i.e. the largest maximum FLOPS and/or the largest maximum memory, may be selected to be the coordinating node.

The vehicles 22, 24, 26 each determine at least one load parameter (analogously to the variants described above) and transmit the at least one determined load parameter to the coordinating node (step S3). Of course, the vehicle 22, 24, 26 being the coordinating node does not need to transmit the at least one determined load parameter.

In addition to the possibilities described above, the at least one load parameter may comprise information on the computational AI tasks currently performed by the individual nodes, i.e. by the individual vehicles 22, 24, 26. For example, the at least one load parameter may comprise information on a model type of a machine-learning model, a number of layers of the machine-learning model, a number of layers of an artificial neural network, and/or information on computational requirements (such as FLOPS and memory) necessary in order to perform the computational AI task.

Based on the load parameters received from the other nodes, the coordinating node allocates a plurality of computational AI tasks to the vehicles 22, 24, 26 (step S4). In other words, based on the load parameters received from the other nodes, the coordinating node decides which vehicle 22, 24, 26 has to perform which computational AI task(s).

It is noted that the method may be re-started from step S1 if the previous coordinating node disconnects from the wireless communication network 10. For example, the previous coordinating node may inform the wireless communication network 10 of its intention to disconnect, or may leave a coverage area of the wireless communication network 10. As another example, the remaining nodes may decide to select a new coordinating node if the received signal quality from the previous coordinating node drops below a critical threshold. Further, a new coordinating node may be selected if a new node connects to the wireless communication network 10, wherein the new node has more computational resources than the previous coordinating node.

Certain embodiments disclosed herein include components, e.g., base stations, user equipment (UE), etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A load balancing method of balancing computational workload in a wireless communication network, the wireless communication network includes at least two nodes being configured to communicate with each other, wherein the at least two nodes comprise a first node and a second node, the load balancing method comprising the steps of:
    determining, by the first node, at least one first load parameter, wherein the at least one first load parameter is indicative of a computational workload of the first node;
    determining, by the second node, at least one second load parameter, wherein the at least one second load parameter is indicative of a computational workload of the second node;
    transmitting, by the first node, the at least one first load parameter to the second node; and
    allocating, by at least the second node, a computational artificial intelligence (AI) task to at least one of the first node and the second node based on the at least one first load parameter and based on the at least one second load parameter.

2. The load balancing method of claim 1, wherein the second load parameter is transmitted to the first node, and wherein the computational AI task is mutually allocated by the first node and the second node.

3. The load balancing method of claim 1, wherein at least one of the first node and the second node is established as a base station.

4. The load balancing method of claim 1, wherein at least one of the first node and the second node is established as user equipment (UE).

5. The load balancing method of claim 1, wherein the computational AI task is a machine-learning inference task.

6. The load balancing method of claim 5, wherein the machine-learning inference task relates to channel state information compression, beam management, or determination of a position.

7. The load balancing method of claim 1, wherein the at least one first load parameter and the at least one second load parameter respectively comprise a computing headroom report, a power consumption report, a state of charge report, and/or a type of power supply.

8. The load balancing method of claim 1, wherein the at least one first load parameter is determined and transmitted to the second node according to a predefined schedule.

9. The load balancing method of claim 1, wherein transmission of the at least one first load parameter is initiated by the first node or by the second node.

10. The load balancing method of claim 1, wherein transmission of the at least one first load parameter is initiated by the first node based on the at least one first load parameter, or by the second node based on the at least one second load parameter.

11. The load balancing method of claim 10, wherein the at least one first load parameter is compared with at least one corresponding first threshold, and/or wherein the at least one second load parameter is compared with at least one corresponding second threshold.

12. The load balancing method of claim 1, wherein the at least two nodes are configured to communicate at least one computation parameter to the communication network, respectively, wherein the at least one computation parameter is indicative of computational resources of the respective node, and wherein a coordinating node is selected from the at least two nodes based on the computation parameters of the at least two nodes.

13. The load balancing method of claim 12, wherein a plurality of computational AI tasks is allocated to the at least two nodes by the coordinating node.

14. The load balancing method of claim 12, wherein a new coordinating node is selected if the previous coordinating node disconnects from the wireless communication network.

15. The load balancing method of claim 12, wherein a new coordinating node is selected if a new node connects to the wireless communication network, wherein the new node has more computational resources than the previous coordinating node.

16. The load balancing method of claim 12, wherein the computation parameters are transmitted by a sidelink.

17. The load balancing method of claim 1, wherein the first node and the second node are configured to communicate with each other via 4G and/or 5G New Radio.

18. A wireless communication system, comprising:
    at least two nodes being configured to communicate with each other, wherein the at least two nodes comprise a first node and a second node,
    the first node being configured to determine at least one first load parameter, wherein the at least one first load parameter is indicative of a computational workload of the first node;
    the second node being configured to determine at least one second load parameter, wherein the at least one second load parameter is indicative of a computational workload of the second node;
    the first node being configured to transmit the at least one first load parameter to the second node; and
    the second node being configured to allocate a computational artificial intelligence (AI) task to at least one of the first node and the second node based on the at least one first load parameter and based on the at least one second load parameter.

19. The wireless communication system of claim 18, wherein the second node is configured to transmit the at least one second load parameter to the first node, and wherein the first node and the second node are configured to mutually allocate the computational AI task.

20. The wireless communication system of claim 18, wherein the wireless communication system is a 4G communication system or a 5G New Radio communication system.

\* \* \* \* \*